(12) United States Patent
Li et al.

(10) Patent No.: US 8,078,131 B2
(45) Date of Patent: Dec. 13, 2011

(54) METHOD FOR MITIGATING INTERFERENCE

(75) Inventors: Xiu-Sheng Li, Tainan (TW); Shin-Lin Shieh, Kinmen County (TW); Shin-Yuan Wang, Hsinchu (TW)

(73) Assignee: Sunplus mMobile Inc., Hsinchu (TW)

( * ) Notice: Subject to any disclaimer, the term of this patent is extended or adjusted under 35 U.S.C. 154(b) by 353 days.

(21) Appl. No.: 12/423,017

(22) Filed: Apr. 14, 2009

(65) Prior Publication Data

US 2009/0264088 A1    Oct. 22, 2009

(30) Foreign Application Priority Data

Apr. 17, 2008 (TW) ................. 97113957 A (51) Int. Cl.
*H04B 1/10* (2006.01)
(52) U.S. Cl. .............. 455/296; 375/285; 375/350
(58) Field of Classification Search .......... 375/285, 375/346, 350; 455/296, 307
See application file for complete search history.

(56) References Cited

U.S. PATENT DOCUMENTS

| | | | |
|---|---|---|---|
| 6,650,716 B1 * | 11/2003 | Ratnarajah | 375/347 |
| 7,545,893 B2 * | 6/2009 | He | 375/346 |
| 7,876,810 B2 * | 1/2011 | McCloud et al. | 375/148 |
| 7,907,685 B2 * | 3/2011 | Chen | 375/336 |
| 2005/0152485 A1 | 7/2005 | Pukkila et al. | |
| 2005/0250466 A1 * | 11/2005 | Varma et al. | 455/296 |
| 2007/0058709 A1 | 3/2007 | Chen et al. | |

* cited by examiner

*Primary Examiner* — Lincoln Donovan
*Assistant Examiner* — William Hernandez
(74) *Attorney, Agent, or Firm* — Jianq Chyun IP Office (57) ABSTRACT

A method for mitigating interference is provided. First, a received signal having a training sequence is received from a transmitter. Then, a Signal-to-Interference-plus-Noise Ratio (SINR) of the training sequence in the received signal is calculated, and whether a co-channel interference signal exists in the received signal is determined according to the SINR. The signal power corresponding to each time index in the received signal is calculated to detect a beginning time point and an ending time point of the co-channel interference signal. Finally, when the co-channel interference signal in the received signal is detected, the time when an interference cancellation filter is turned on is determined by the beginning time point and the ending time point.

12 Claims, 12 Drawing Sheets

METHOD FOR MITIGATING INTERFERENCE

CROSS-REFERENCE TO RELATED APPLICATION

This application claims the priority benefit of Taiwan application serial No. 97113957, filed on Apr. 17, 2008. The entirety of the above-mentioned patent application is hereby incorporated by reference herein and made a part of this specification.

BACKGROUND OF THE INVENTION

1. Field of the Invention

The present invention generally relates to a method for mitigating reference, and more particularly, to a method for mitigating co-channel interference in a received signal.

2. Description of Related Art

Figure 1:
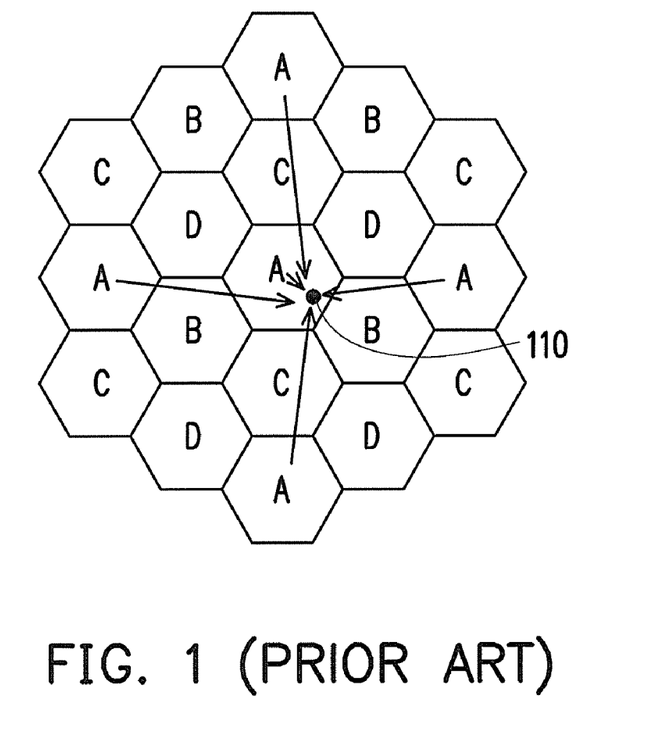
FIG. 1 is a diagram of a cellular wireless communication system.

In a wireless communication environment, a signal transmitted therein may receive co-channel interference when the signal transmitted of the band is the same as the band used in neighboring areas. Thus, the cellular structure adopted by an existing wireless communication system allows all the neighboring areas to use different bands, as shown in FIG. 1. FIG. 1 is a diagram of a cellular wireless communication system. Referring to FIG. 1, the areas A, B, C, and D all use different bands, and those areas using the same band are all separated by other areas. When the handheld device 110 is in the area A as shown in FIG. 1, a signal transmitted by an access point (AP) in the area A to the handheld device will not be interfered by signals in the neighbouring areas B, C, and D. Meanwhile, since those areas using the same band as the area A are all located far away. The co-channel interferences thereof have lower power and accordingly the signal received by the handheld device 110 will not be affected by the co-channel interference.

Figure 2:
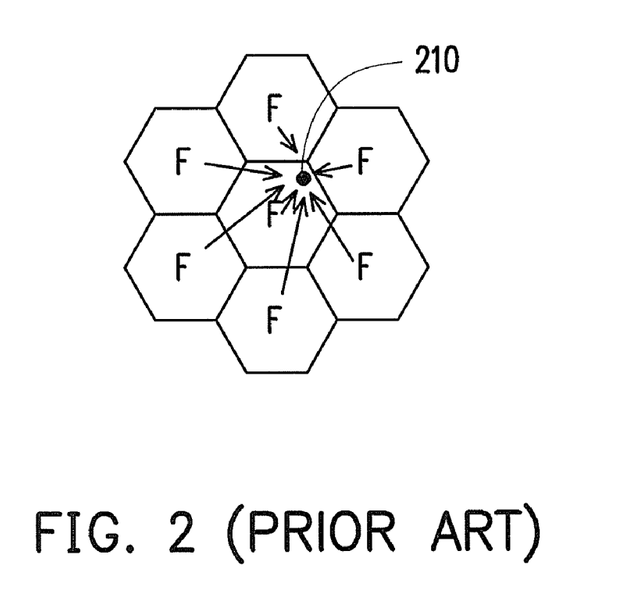
FIG. 2 is a diagram of a cellular wireless communication system.

The method described above will reduce the band efficiency and accordingly will reduce the capacity of the system. However, some of the handheld devices may be disabled when the number of users in the system is increased. Thus, some existing communication systems adopt the structure as illustrated in FIG. 2 in order to increase the capacity of the system. FIG. 2 is a diagram of a cellular wireless communication system. Referring to FIG. 2, each area F uses the same band, and accordingly the signal transmitted between the AP and the handheld device 210 will be interfered by the neighbouring APs easily. Thus, with the cellular structure illustrated in FIG. 2, the receiver usually adopts a single antenna interference cancellation (SAIC) technique for mitigating the co-channel interference in a received signal.

Presently, a receiver usually adopts both the SAIC technique and a channel estimation technique for mitigating interference in a received signal. However, the performance of the receiver can be greatly improved when the co-channel interference is very serious, but the performance of the receiver may be degraded to even worse than that of a receiver without SAIC technique when the co-channel interference is very weak.

A switching mechanism is disclosed in U.S. Patent Publication No. 2007/0058709, wherein a receiver can dynamically switch between a SAIC equalizer and a maximum-likelihood sequence estimation (MLSE) equalizer. Moreover, this mechanism allows the receiver to select the SAIC equalizer or the MLSE equalizer to process a burst signal so that the performance of the receiver is improved.

A SAIC receiver is disclosed in U.S. Patent No. 2005/0152485, wherein the receiver calculates the correlation between a plurality of training sequences defined by the system and an interference signal determines the time difference between the interference signal and the desired signal according to the correlation, and then provides the time difference to a backend channel estimation unit.

SUMMARY OF THE INVENTION

Accordingly, the present invention is directed to a method for mitigating interference in a received signal at a receiver end.

The present invention provides an interference mitigating method including following steps. First, a received signal having a training sequence is received from a transmitter. Then, a signal-to-interference-plus-noise ratio (SINR) of the training sequence in the received signal is calculated, and whether a co-channel interference signal exists in the received signal is determined according to the SINR. The signal power corresponding to each time index in the received signal is calculated to detect a beginning time point and an ending time point of the co-channel interference signal. Finally, when it is determined that the co-channel interference signal does exist in the received signal, the time when an interference cancellation filter is turned on is determined by the beginning time point and the ending time point.

According to an embodiment of the present invention, a maximum-likelihood sequence estimation (MLSE) is performed to equalize the received signal when it is determined that the co-channel interference signal does not exist in the received signal.

According to an embodiment of the present invention, the received signal is equalized through the interference cancellation filter when the time indexes corresponding to the received signal are between the beginning time point and the ending time point, and the received signal is equalized through a MLSE when the time indexes corresponding to the received signal are not between the beginning time point and the ending time point.

According to an embodiment of the present invention, the step of calculating the SINR of the training sequence in the received signal includes: estimating a first channel impulse response by using the training sequence in the received signal; calculating a convolution of a predetermined training sequence and the first channel impulse response to obtain a first estimated signal, and calculating the power of the first estimated signal; calculating a difference between the first estimated signal and the training sequence in the received signal to obtain a first interference noise, and calculating the power of the first interference noise; and calculating a ratio of the power of the first estimated signal to the power of the first interference noise to obtain the SINR.

According to an embodiment of the present invention, the step of determining whether the co-channel interference signal exists in the received signal includes: comparing the SINR with a first threshold; and determining that the co-channel interference signal exists in the received signal when the SINR is smaller than the first threshold, otherwise, determining that the co-channel interference signal does not exists in the received signal.

According to an embodiment of the present invention, the step of detecting the beginning time point and the ending time point of the co-channel interference signal includes: sequentially calculating the signal power of the received signal corresponding to each time index according to the time indexes of the received signal; sequentially calculating a difference between the signal power of the received signal corresponding to the $k^{th}$ time index and the signal power of the received signal corresponding to the $(k-1)^{th}$ time index according to the time indexes of the received signal; calculating a threshold power; calculating a threshold variation; locating a first time and a second time among the time indexes of the received signal, wherein the first time is the minimum time index in the signal power of the received signal greater than or equal to the threshold power, and the second time is the maximum time index in the signal power of the received signal greater than or equal to a threshold power; locating a third time and a fourth time among the time indexes of the received signal, wherein the third time is the minimum time index in the signal power difference of the received signal greater than or equal to the threshold variation, and the fourth time is the maximum time index in the signal power difference of the received signal greater than or equal to a threshold variation; selecting the smaller one of the first time and the third time as the beginning time point; and selecting the greater one of the second time and the fourth time as the ending time point.

According to the present invention, a beginning time point and an ending time point of a co-channel interference signal are detected, and the time when an interference cancellation filter is turned on is determined by the detected beginning time point and ending time point so that the interference cancellation filter is turned on precisely when the co-channel interference signal exists in the received signal, and accordingly, the performance of a receiver is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10(*a*) illustrates a waveform of signal power of a burst signal.

FIG. 10(*b*) illustrates a waveform of signal power difference of a burst signal.

FIG. 12(*a*) illustrates a waveform of signal power of a compensated burst signal.

FIG. 12(*b*) illustrates a waveform of signal power difference of a compensated burst signal.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
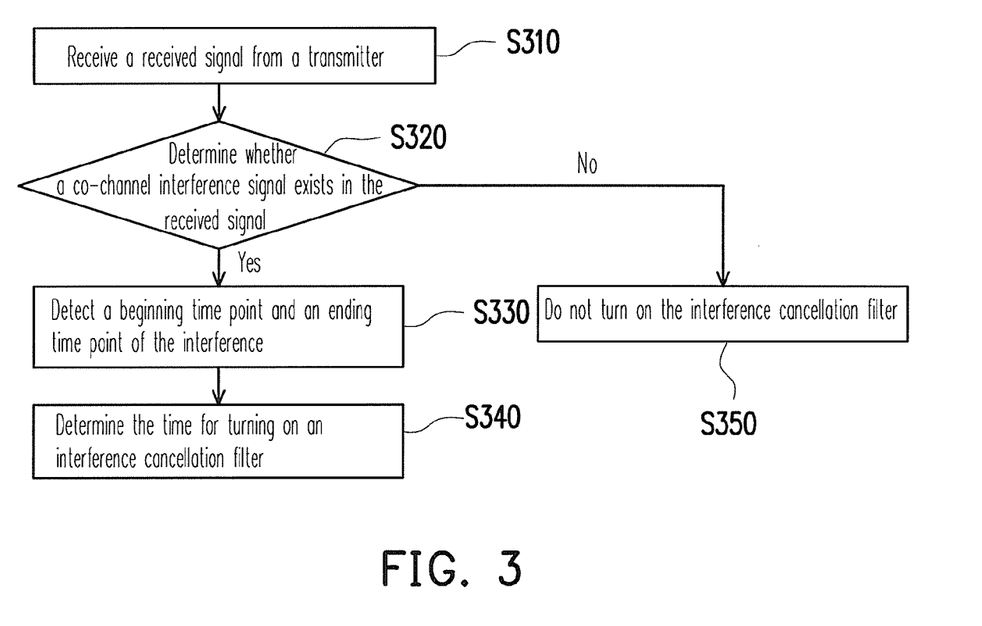
FIG. 3 is a flowchart of an interference mitigating method according to an embodiment of the present invention.

FIG. 3 is a flowchart of an interference mitigating method according to an embodiment of the present invention. In the present embodiment, it is assumed that the interference mitigating method is applied to a receiver, and the receiver has an interference cancellation filter for mitigating the co-channel interference in a received signal.

Referring to FIG. 3, first, the receiver receives a received signal from a transmitter (step S310), wherein the received signal has a training sequence. Then, the receiver calculates a signal-to-interference-plus-noise ratio (SINR) of the training sequence in the received signal and determines whether a co-channel interference signal exists in the received signal according to the SINR. Namely, the receiver determines that whether the received signal receives any co-channel interference (step S320).

When the co-channel interference signal exists in the received signal, the receiver calculates the signal power corresponding to each time index in the received signal to detect a beginning time point and an ending time point of the interference (step S330). Because the amplitude of the received signal is drastically increased or decreased when it receives co-channel interference. In the present embodiment, the beginning time point and the ending time point of the interference are detected by detecting the power of the received signal.

After the beginning time point and the ending time point of the interference are obtained, the receiver determines the duration for turning on the interference cancellation filter according to the beginning time point and the ending time point (step S340). In other words, when the receiver determines the time section when the received signal receives the co-channel interference according to the detected beginning time point and ending time point, the interference cancellation filter is used for cancelling the co-channel interference when it is determined that the received signal receives the co-channel interference. Contrarily, when the receiver determines that the co-channel interference signal does not exist in the received signal in step S320, the receiver does not turn on the interference cancellation filter (step S350). Instead, it directly equalizes and demodulates the received signal.

The interference cancellation filter in the receiver may adopt the single antenna interference cancellation (SAIC) technique or other interference cancellation techniques. In addition, the steps S320 and S330 in foregoing embodiment may be performed at the same time or sequentially. In other words, after receiving the received signal, the receiver may directly detect the beginning time point and the ending time point of the interference and determine whether the received signal receives any co-channel interference at the same time.

Figure 4:
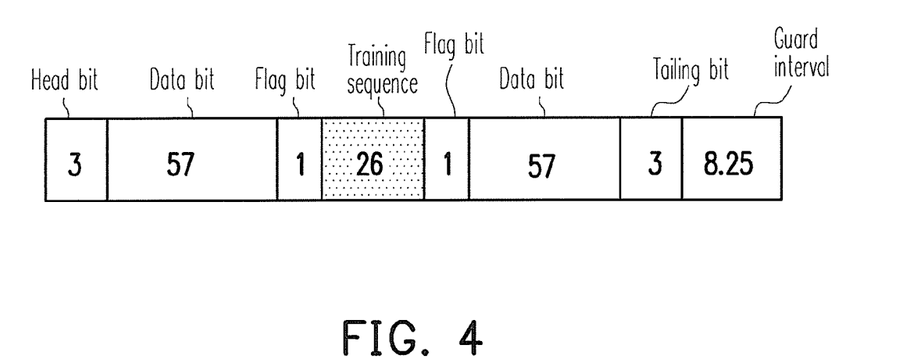
FIG. 4 is a diagram illustrating the data structure of a burst signal in a Global System for Mobile communications (GSM).

In order to allow those having ordinary skill in the art to implement the present invention through the present embodiment, the application of the present invention in a Global System for Mobile communications (GSM) will be described below. According to the specification of GSM, data is transmitted using timeslot in a burst mode. Thus, the following received signal may be a burst signal. FIG. 4 is a diagram illustrating the data structure of a burst signal in a GSM system. Referring to FIG. 4, a burst signal usually includes a head bit, data bits, a flag, a training sequence, a tailing bit, and a guard interval. The training sequence includes 26 bits and is located in the middle of the burst signal. The entire burst signal has 148 bits excluding the guard interval.

When a burst signal issued by an access point (AP) is interfered by a signal from another AP, the interference signal will be filtered out by a bandpass filter of front end in the receiver if the band adopted by the other AP is different from that adopted by the present AP. However, the signal issued by the other AP will become a serious co-channel interference signal if the band adopted by the other AP is the same as that adopted by the serving AP.

Figure 5:
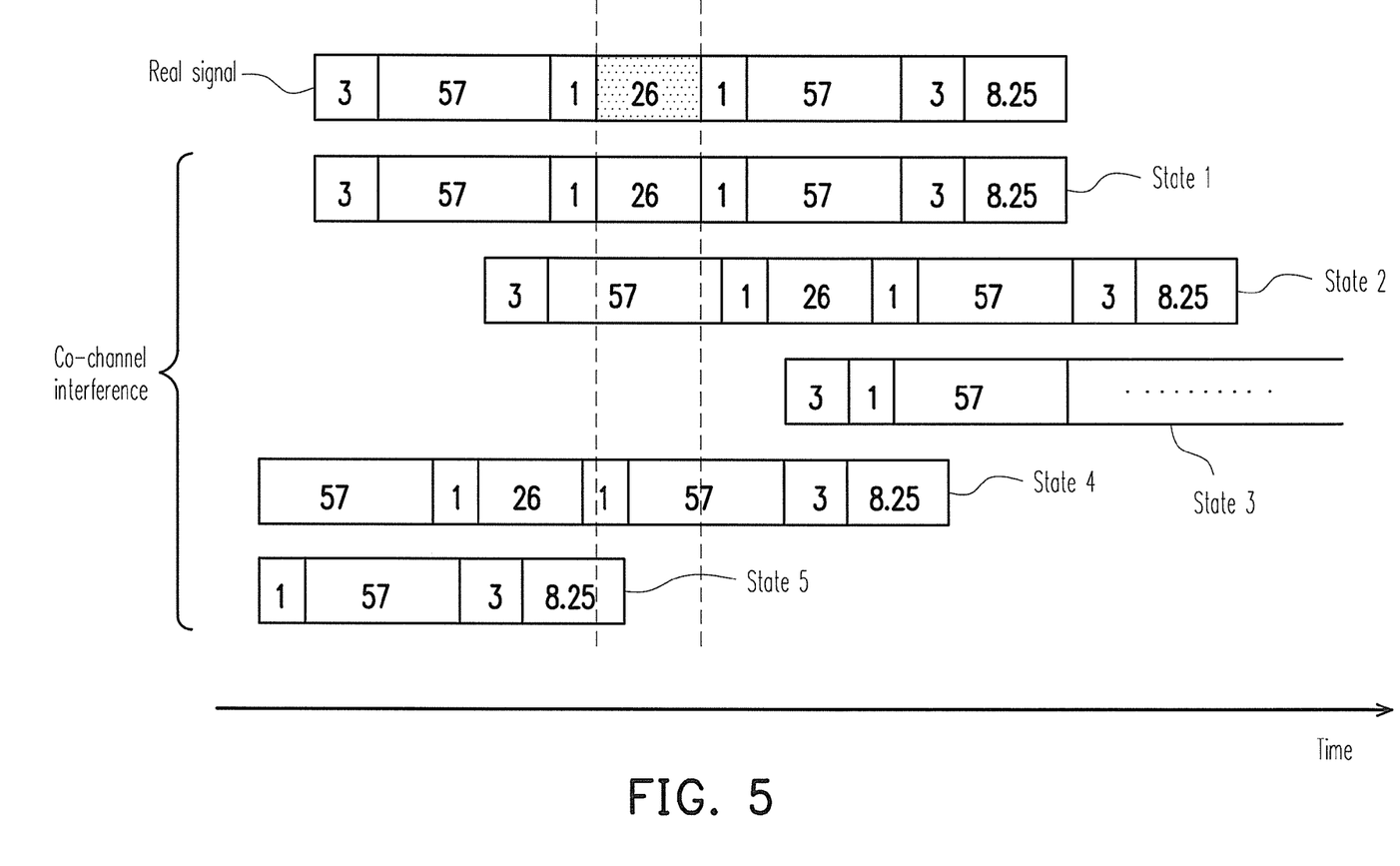
FIG. 5 is a diagram of a real burst signal and co-channel interference signals in time domain.

Aforementioned co-channel interference may be synchronous or asynchronous to the real burst signal in time domain. Based on the training sequence in the burst signal, the possible conditions between co-channel interference and a burst signal are illustrated in FIG. 5. Referring to FIG. 5, the abscissa indicates the time, and the states of a real burst signal and five co-channel interferences are illustrated in FIG. 5. The co-channel interference in state 1 is completely synchronous to the real burst signal. The co-channel interferences in states 2~5 are asynchronous to the real burst signal, wherein the co-channel interference in state 2 occurs later than the real burst signal but before the training sequence, the co-channel interference in state 3 occurs after the training sequence, the co-channel interference in state 4 occurs earlier than the real burst signal but is ended after the training sequence, and the co-channel interference in state 5 occurs earlier than the real burst signal but is ended before the training sequence.

As shown in FIG. 5, the co-channel interferences in states 2~5 do not interfere the entire burst signal. However, if the receiver processes the entire burst signal with its interference cancellation filter, the burst signal without any co-channel interference will be distorted due to overcompensation, and accordingly an incorrect information will be obtained by the receiver. Thus, the interference cancellation filter in the receiver should be turned on/off flexibly within a burst signal.

Figure 6:
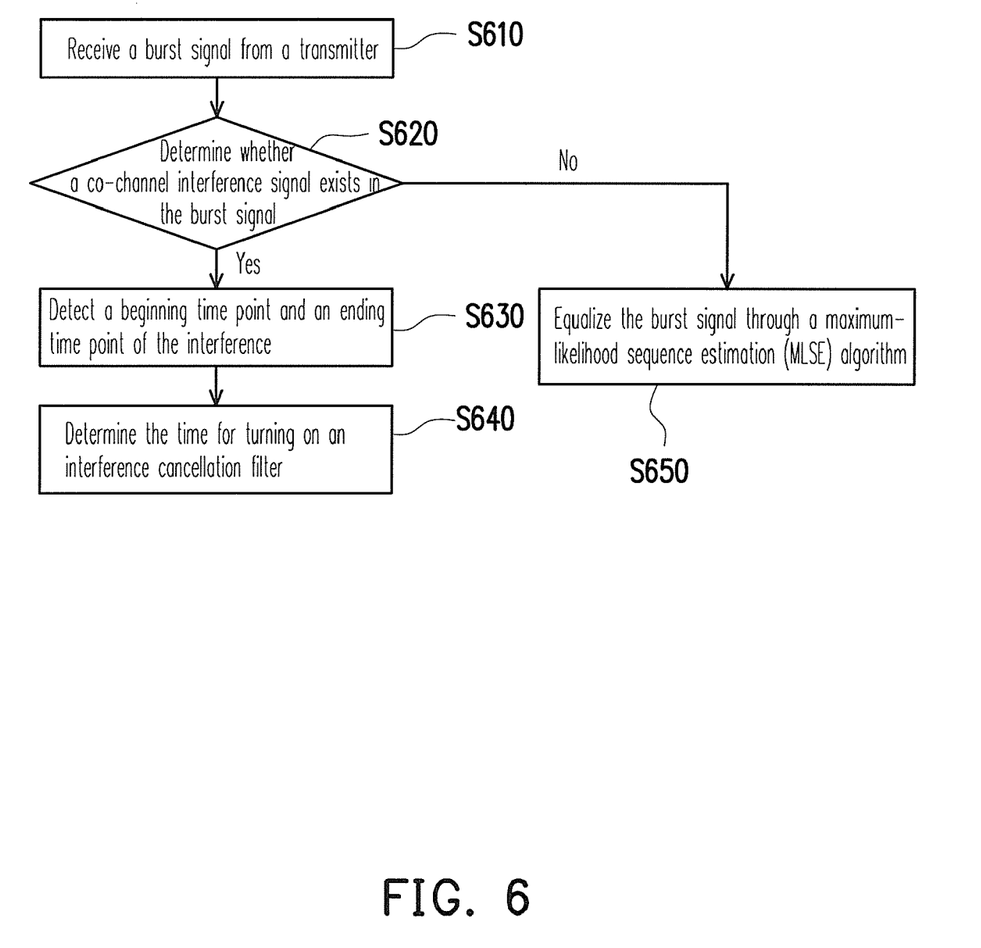
FIG. 6 is a flowchart of an interference mitigating method according to another embodiment of the present invention.

FIG. 6 is a flowchart of an interference mitigating method according to another embodiment of the present invention. First, the receiver receives a burst signal from a transmitter (step S610). Based on the data structure of burst signal illustrated in FIG. 4, a burst signal has a training sequence of 26 bits according to the specification of GSM. Then, the receiver calculates the SINR of the training sequence of the burst signal and determines whether a co-channel interference signal exists in the burst signal according to the SINR (step S620). Namely, the receiver determines whether the received signal receives any co-channel interference.

Figure 7:
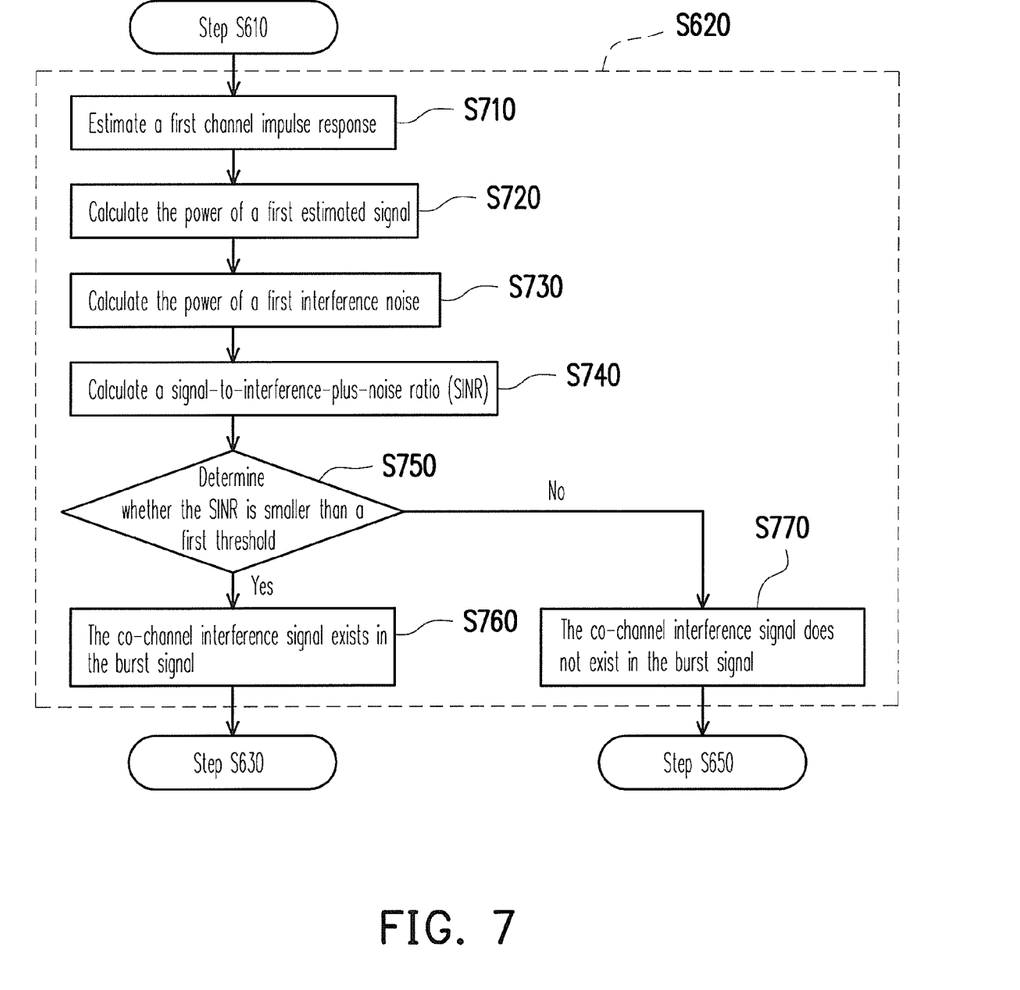
FIG. 7 is a flowchart illustrating sub-steps of step S620.

In the present embodiment, the step S620 further includes a plurality of sub-steps as shown in FIG. 7. Referring to FIG. 7, first, the receiver estimates a first channel impulse response by using the training sequence in the burst signal (step S710). For the convenience of description, the estimated first channel impulse response is denoted as $\underline{\hat{h}}$ thereinafter, wherein the underline shows that the symbol represents a vector. The received burst signal is denoted as r[k] (k=0, . . . , 147). As the data structure described above of a burst signal in a GSM system, the training sequence in the burst signal is r[k](k= 61, . . . , 86). The technique in foregoing step S710 for estimating a channel impulse response by using the training sequence is a well-understood technique therefore will not be described herein.

Next, the receiver calculates the convolution of a predetermined training sequence and the first channel impulse response to obtain a first estimated signal and calculates the power of the first estimated signal (step S720). The predetermined training sequence is a signal preset in the receiver and denoted as $\underline{s}$=[s[0]s[1] . . . s[25]]. The first estimated signal is denoted as $\underline{\tilde{s}}$, and the value thereof is $\underline{\tilde{s}}=\underline{s}\otimes\underline{\hat{h}}$. As shown in foregoing expression of the first estimated signal $\underline{\tilde{s}}$, the first estimated signal $\underline{\tilde{s}}$ represents the original training sequence without the co-channel interference is only affected by channel impulse response. In other words, the first estimated signal $\underline{\tilde{s}}$ does not have any interference or noise.

Additionally, the formula for calculating the power of the first estimated signal $\underline{\tilde{s}}$ may be:

$$P_{\tilde{s}} = \frac{1}{26}\sum_{k=0}^{25}|\tilde{s}[k]|^2.$$

In order to reduce the affection of the channel to part of the training sequence in the burst signal, the first l signals in the first estimated signal $\underline{\tilde{s}}$ are not considered while calculating the power. Thus, the formula for calculating the power of the first estimated signal $\underline{\tilde{s}}$ is:

$$P_{\tilde{s}} = \frac{1}{27-l}\sum_{k=0}^{26-l}|\tilde{s}[l-1+k]|^2,$$

wherein l represents the channel length of the first channel impulse response $\underline{\hat{h}}$.

Thereafter, the receiver calculates the difference between the first estimated signal $\underline{\tilde{s}}$ and the training sequence r[k] (k=61, . . . , 86) in the burst signal to obtain a first interference noise and calculates the power of the first interference noise (step S730), wherein the first interference noise is denoted as $\underline{z}$, and the value thereof is $\underline{z}$=[z[0]z[1] . . . z[25]]=[r[61]r[62] . . . r[86]]−[$\tilde{s}$[0]$\tilde{s}$[1] . . . $\tilde{s}$[25]]. Since the first estimated signal $\underline{\tilde{s}}$ without interference or noise has been calculated as above, the first interference noise $\underline{z}$ obtained based on the difference between the first estimated signal $\underline{\tilde{s}}$ and the training sequence r[k] (k=61, . . . , 86) in the burst signal can be considered as the interference and noise in the training sequence in the burst signal.

In addition, the method for calculating the power of the first interference noise $\underline{z}$ in foregoing step S730 may be similar to the power calculation method in step S720, and accordingly the expression for calculating the power of the first interference noise $\underline{z}$ may be:

$$P_z = \frac{1}{26}\sum_{k=0}^{25}|z[k]|^2 \text{ or } P_z = \frac{1}{27-l}\sum_{k=0}^{26-l}|z[l-1+k]|^2.$$

Next, the receiver calculates a ratio of the power $P_{\tilde{s}}$ of the first estimated signal to the power $P_z$ of the first interference noise to obtain the SINR (step S740), wherein the SINR is denoted as, and the value thereof is $$SINR_a = \frac{P_{\tilde{s}}}{P_z}.$$

After that, whether the SINR of the receiver is smaller than a first threshold is determined (step S750). Since the co-channel interference signal is caused by signals having the same band transmitted in neighbouring areas, the received burst signal may contain many co-channel interferences and accordingly the SINR thereof may be reduced.

Accordingly, the receiver determines that a co-channel interference signal exists in the burst signal when the SINR is smaller than the first threshold (step S760). Contrarily, the receiver determines that the co-channel interference signal does not exist in the burst signal when the SINR is greater than or equal to the first threshold (step S770). In the present embodiment, the first threshold can be adjusted by the receiver according to the hardware design of system specification for example.

Figure 8:
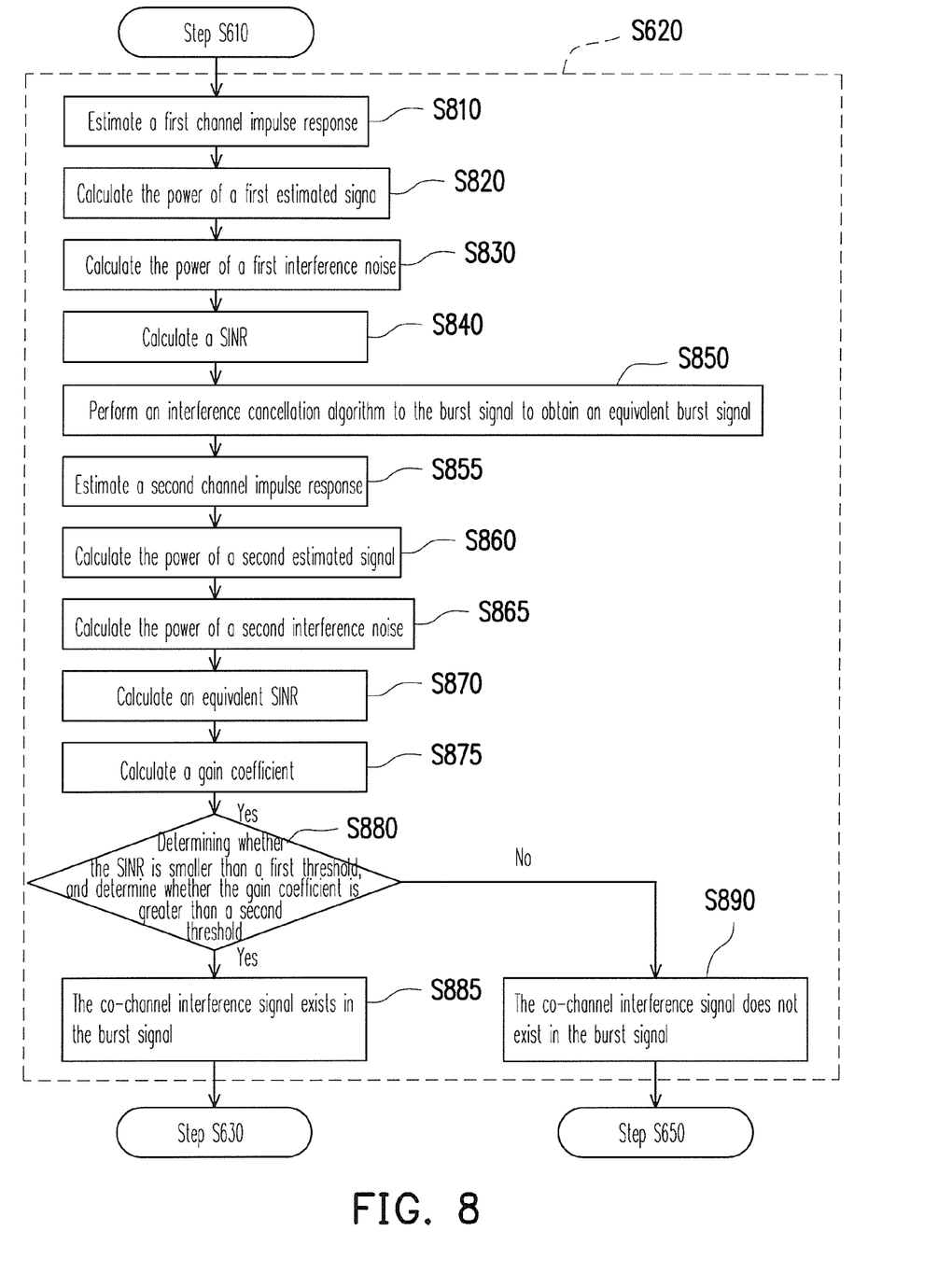
FIG. 8 is a flowchart illustrating sub-steps of step S620.

As shown in FIG. 7, the receiver detects co-channel interference through the value of the SINR. In order to allow the receiver to determine whether the co-channel interference exists in the burst signal more precisely, a gain coefficient is further adopted in the present embodiment. The receiver detects the co-channel interference according to both the SINR and the gain coefficient. The detailed steps are illustrated in FIG. 8. Referring to FIG. 8, the steps S810~S840 which are the same as the steps S710~S740 in FIG. 7 therefore will not be described herein. Next, the receiver executes an interference cancellation algorithm to the received burst signal to obtain an equivalent burst signal (step S850). In the present embodiment, the receiver may include an interference cancellation filter. In foregoing step S850, the receiver may filter the received burst signal through the interference cancellation filter to obtain a filtered equivalent burst signal.

Thereafter, the receiver calculates a second channel impulse response by using the equivalent training sequence in the equivalent burst signal (step S855). For the convenience of description, in the present embodiment, the equivalent burst signal is denoted as r'[k] (k=0, . . . , 147), the equivalent training sequence in the equivalent burst signal is denoted as r'[k] (k=61, . . . , 86), and the second channel impulse response estimated through the equivalent training sequence is denoted as $\hat{h}'$.

After obtaining the second channel impulse response $\hat{h}'$, the receiver calculates the convolution of a predetermined training sequence and the second channel impulse response to obtain a second estimated signal, and then calculates the power of the second estimated signal (step S860), wherein the predetermined training sequence is a preset signal of the receiver and is denoted as s=[s[0] s[1] . . . s[25]], and the second estimated signal is denoted as $\tilde{s}'$. The methods for calculating the second estimated signal $\tilde{s}'$ and the power thereof in foregoing step S860 are similar to those in step S720 (as shown in FIG. 7). Accordingly, the value of the second estimated signal is $\tilde{s}'=s \otimes \hat{h}'$, and the power thereof may be $$P_{\tilde{s}'} = \frac{1}{26}\sum_{k=0}^{25}|\tilde{s}'[k]|^2 \text{ or } P_{\tilde{s}'} = \frac{1}{27-l}\sum_{k=0}^{26-l}|\tilde{s}'[l-1+k]|^2.$$

Next, the receiver calculates the difference between the second estimated signal $\tilde{s}'$ and the burst signal to obtain a second interference noise and calculates the power of the second interference noise (step S865), wherein the second interference noise is denoted as z', and the value thereof is z'=[z'[0]z'[1] . . . z'[25]]=[r'[61]r'[62] . . . r'[86]]−[$\tilde{s}'$[0]$\tilde{s}'$[1] . . . $\tilde{s}'$[25]]In foregoing step S865, the method for calculating the power of the second interference noise z' may be the same as that in step S730 (as shown in FIG. 7). Thus, the power of the second interference noise z' may be:

$$P_{z'} = \frac{1}{26}\sum_{k=0}^{25}|z'[k-1]|^2 \text{ or } P_{z'} = \frac{1}{27-l}\sum_{k=0}^{26-l}|z'[l-1+k]|^2.$$

Next, the receiver calculates a ratio of the power $P_{\tilde{s}'}$ of the second estimated signal to the power $P_{z'}$ of the second interference noise to obtain an equivalent SINR (step S870) and calculates a ratio of the equivalent SINR to the SINR to obtain a gain coefficient (step S875), wherein the equivalent SINR is denoted as $SINR_b$, and the value thereof is $$SINR_b = \frac{P_{\tilde{s}'}}{P_{z'}}.$$

The gain coefficient is denoted as G, and the value thereof is $$G = \frac{SINR_b}{SINR_a}.$$

Thereafter, the receiver determines whether the SINR is smaller than a first threshold and whether the gain coefficient is greater than a second threshold (step S880), wherein the first threshold and the second threshold may be adjusted by the receiver according to the hardware design and system specification. When the SINR is smaller than the first threshold and the gain coefficient is greater than the second threshold, the receiver determines that a co-channel interference signal exists in the burst signal (step S885); otherwise, the receiver determines that the co-channel interference signal does not exist in the burst signal (step S890). Owing to the steps S880~S890 in the present embodiment, not only determining the existence of co-channel interference by using the SINR, but also to adopt an interference cancellation technique by gain coefficient to let the receiver effectively increase the SINR.

Referring to FIG. 6 again, if the receiver determines that the co-channel interference signal does not exist in the burst signal in step S620, the receiver does not turn on its interference cancellation filter but performs a maximum-likelihood sequence estimation (MLSE) algorithm to equalize the burst signal (step S650).

Contrarily, if the receiver determines that the co-channel interference signal exists in the burst signal, the receiver detects a beginning time point and an ending time point of the interference (step S630). Since the amplitude of the received signal will increase or decrease drastically when the received signal receives co-channel interference, in the present embodiment, the beginning time point and the ending time point of the interference are detected by detecting the power of the received signal. Foregoing step S630 includes a plurality of sub-steps, as shown in FIG. 9.

Figure 9:
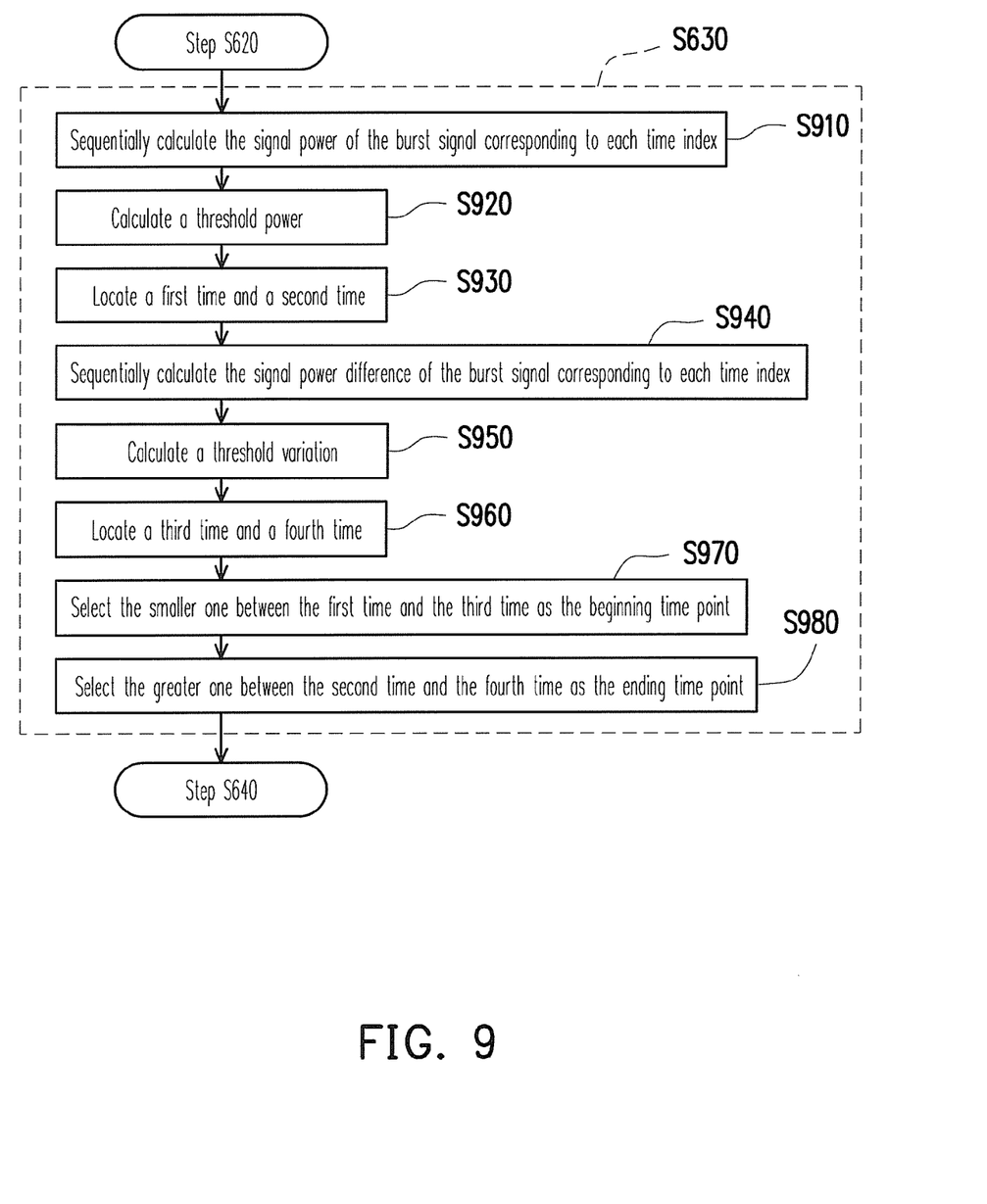
FIG. 9 is a flowchart illustrating sub-steps of step S630.

Referring to FIG. 9, first, the receiver sequentially calculates the signal power of the burst signal corresponding to each time index according to the time indexes of the burst signal (step S910). Below, a time index is denoted as k, the signal power corresponding to the time index is denoted as $P_0[k]$, and the value thereof may be the square of the received burst signal and denoted as $P_0[k]=|r[k]|^2$, wherein k=0, . . . , 147. For the convenience of description, in the present embodiment, the waveform of the signal power of the burst signal is assumed to be like that illustrated in FIG. 10(a), wherein the abscissa indicates the sampling time k, and the ordinate indicates the signal power $P_0[k]$.

Figure 10:
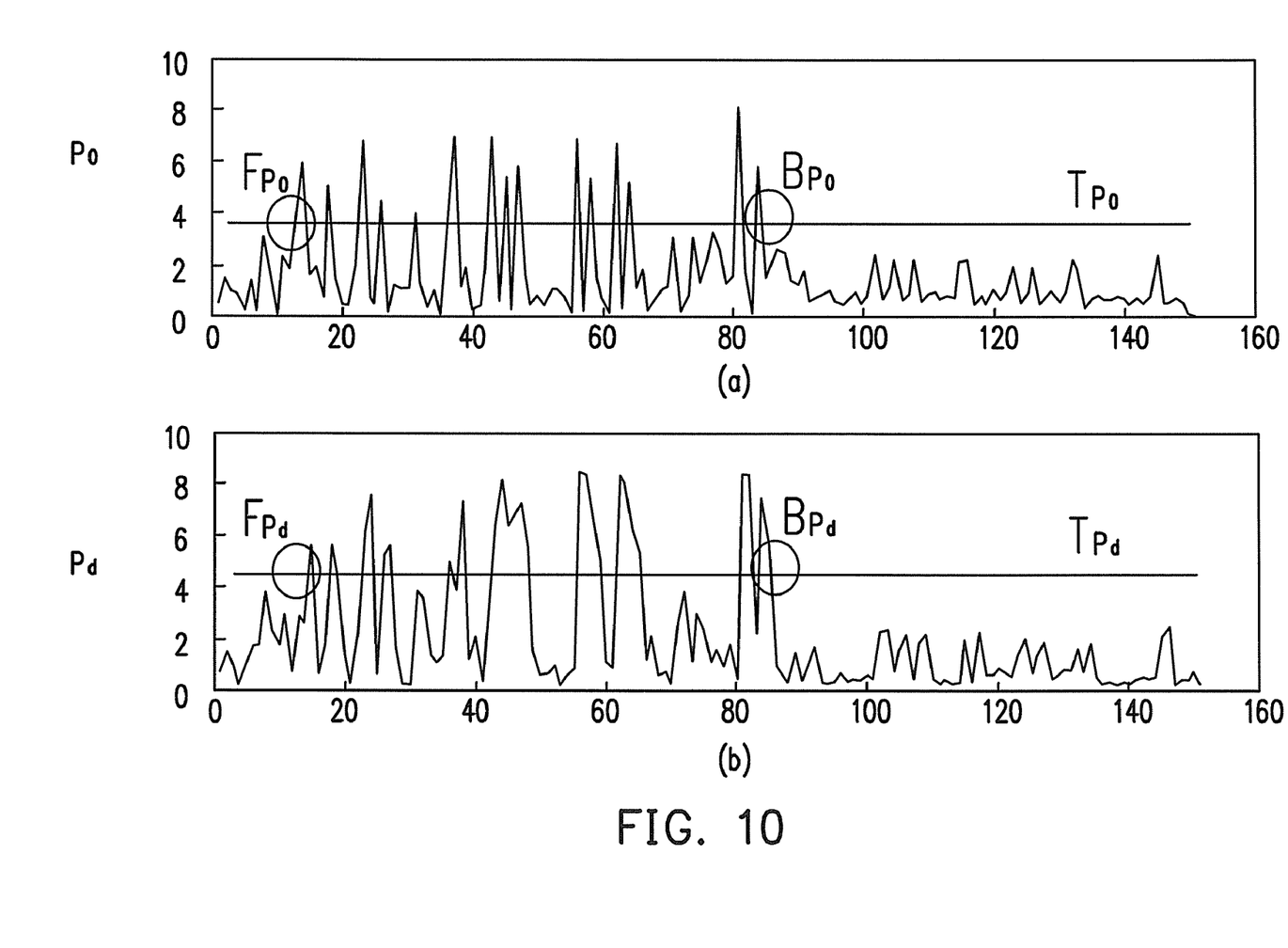

Referring to both FIG. 9 and FIG. 10(a), the receiver calculates a threshold power (step S920), wherein the threshold power is denoted as $T_{P_0}$, and the threshold power may be calculated by selecting N signal powers having the maximum values from the signal power $P_0[k]$, and the selected signal powers are denoted as $\alpha_0, \alpha_1, \ldots, \alpha_{N-1}$. The value of the threshold power may be:

$$T_{P_0} = \gamma \cdot \frac{1}{N} \sum_{i=0}^{N-1} \alpha_i$$

wherein $\gamma$ is a parameter used by the receiver for adjusting the threshold power.

Next, the receiver locates a first time and a second time among the time indexes (i.e., k=0, ..., 147) corresponding to the burst signal (step S930), wherein the first time is denoted as $F_{P_0}$, and the second time is denoted as $B_{P_0}$. In foregoing step S930, the receiver finds a signal power $P_0[k]$ from the time index k which is greater than or equal to the threshold power $T_{P_0}$ and then respectively selects the minimum time index in the signal power $P_0[k]$ which is greater than or equal to the threshold power $T_{P_0}$ as the first time $F_{P_0}$ and the maximum time index in the signal power $P_0[k]$ which is greater than or equal to the threshold power $T_{P_0}$ as the second time $B_{P_0}$. In other words, the first time $F_{P_0}=\min\{k|P_0[k]\geq T_{P_0}\}$, and the second time $B_{P_0}=\max\{k|P_0[k]\geq T_{P_0}\}$.

Referring to FIG. 9 again, the receiver sequentially calculates the difference between the signal power of the burst signal corresponding to the $k^{th}$ time index and the signal power of the burst signal corresponding to the $(k-1)^{th}$ time index according to the time indexes of the burst signal (step S940). The signal power difference is denoted as $P_d[k]$ thereinafter, wherein k=0, ..., 147. In foregoing step S940, the receiver may set the signal power difference $P_d[0]$ (k=0) to a random value, such as $P_0[0]$, and the value of the signal power difference $P_d[k]$ (k is between 0 and 147) may be $P_d[k]=|P_0[k]-P_0[k-1]|$. For the convenience of description, the waveform of the signal power difference of the burst signal is assumed to be like that illustrated in FIG. 10(b), wherein the abscissa indicates the sampling time k, and the ordinate indicates the signal power difference $P_d[k]$.

Referring to both FIG. 9 and FIG. 10(b), next, the receiver calculates a threshold variation (step S950), wherein the threshold variation is denoted as $T_{P_d}$. The threshold variation may be calculated as described in foregoing step S920, wherein a plurality of signal power differences having maximum values are selected from $P_d[k]$ and then the average of these selected signal power differences is served as the threshold variation.

Thereafter, the receiver locates a third time and a fourth time among the time indexes (i.e., k=0, ..., 147) corresponding to the burst signal (step S960), wherein the third time is denoted as $F_{P_d}$, and the fourth time is denoted as $B_{P_d}$. In foregoing step S960, the receiver first finds those signal power differences $P_d[k]$ in the time indexes k which are greater than or equal to the threshold variation $T_{P_d}$ and then selects the minimum time index in the signal power differences $P_d[k]$ which are greater than or equal to the threshold variation $T_{P_d}$ as the third time $F_{P_d}$ and the maximum time index in the signal power differences $P_d[k]$ which are greater than or equal to the threshold variation $T_{P_d}$ as the fourth time $B_{P_d}$. In other words, the third time $F_{P_d}=\min\{k|P_d[k]\geq T_{P_d}\}$, and the fourth time $B_{P_d}=\max\{k|P_d[k]\geq T_{P_d}\}$.

Referring to both FIG. 9 and FIG. 10(a)(b), finally, the receiver respectively selects the smaller one between the first time $F_{P_0}$ and the third time $F_{P_d}$ as the beginning time point (step S970) and the greater one between the second time $B_{P_0}$ and the fourth time $B_{P_d}$ as the ending time point (step S980). In other words, the beginning time point of the interference is $\min(F_{P_0}, F_{P_d})$, and the ending time point of the interference is $\max(B_{P_0}, B_{P_d})$. Additionally, in the present embodiment, the beginning time point may also be the greater one between the first time $F_{P_0}$ and the third time $F_{P_d}$ or the average of the first time $F_{P_0}$ and the third time $F_{P_d}$, and similarly, the ending time point may also be determined otherwise. Thus, the method for determining the beginning time point and the ending time point is not limited in the present embodiment.

As shown in FIG. 9, the beginning time point and the ending time point of the interference are determined through the signal power and signal power difference of the burst signal. However, those having ordinary skill in the art should be able to know that in the present embodiment, the beginning time point and the ending time point may also be determined through only the signal power. Namely, the beginning time point and the ending time point of the interference are determined by using the first time and the second time. Moreover, the beginning time point and the ending time point of the interference may also be determined through only the signal power difference, namely, the beginning time point and the ending time point of the interference are determined by using the third time and the fourth time.

Figure 11:
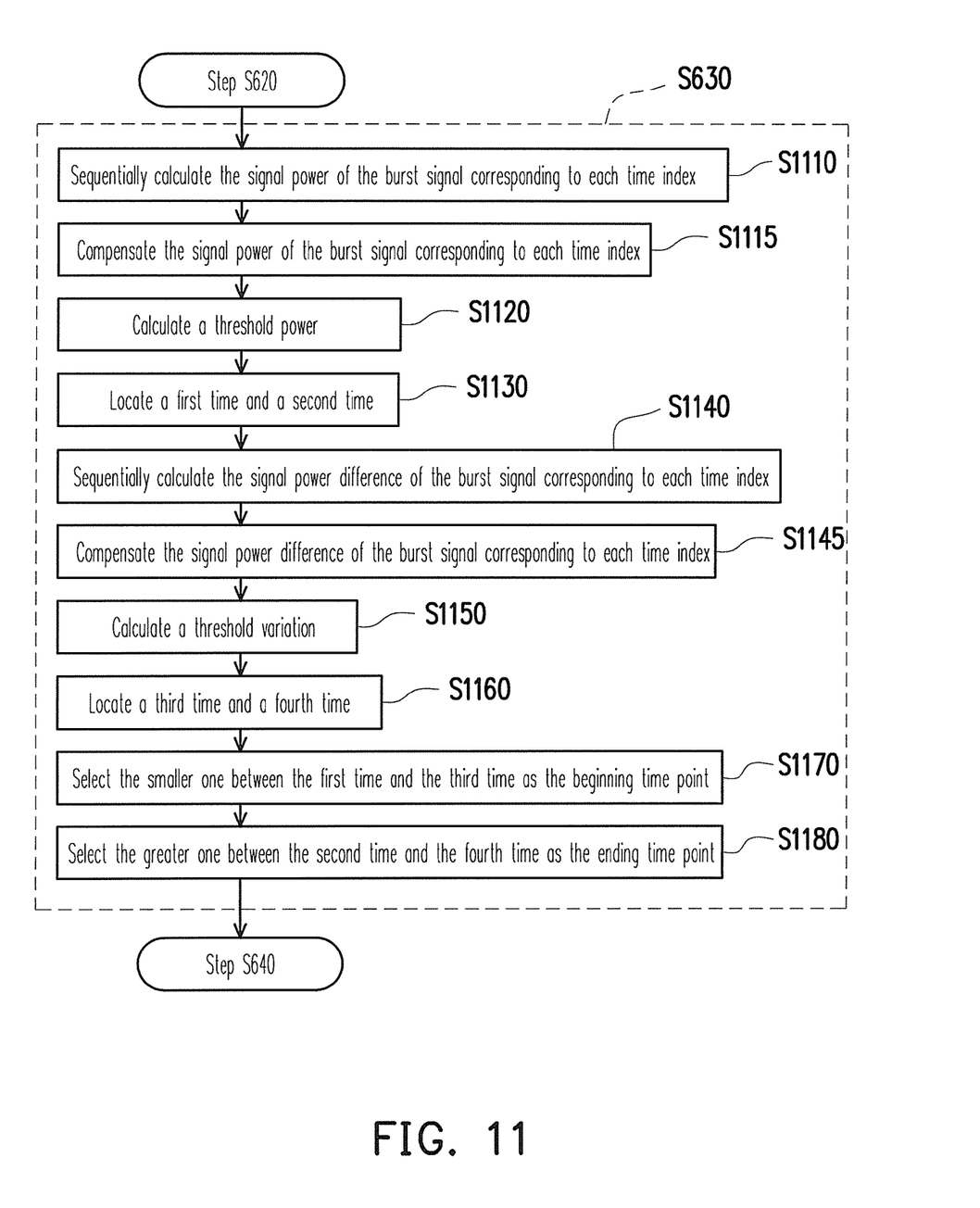
FIG. 11 is a flowchart illustrating sub-steps of step S630.
Figure 12:
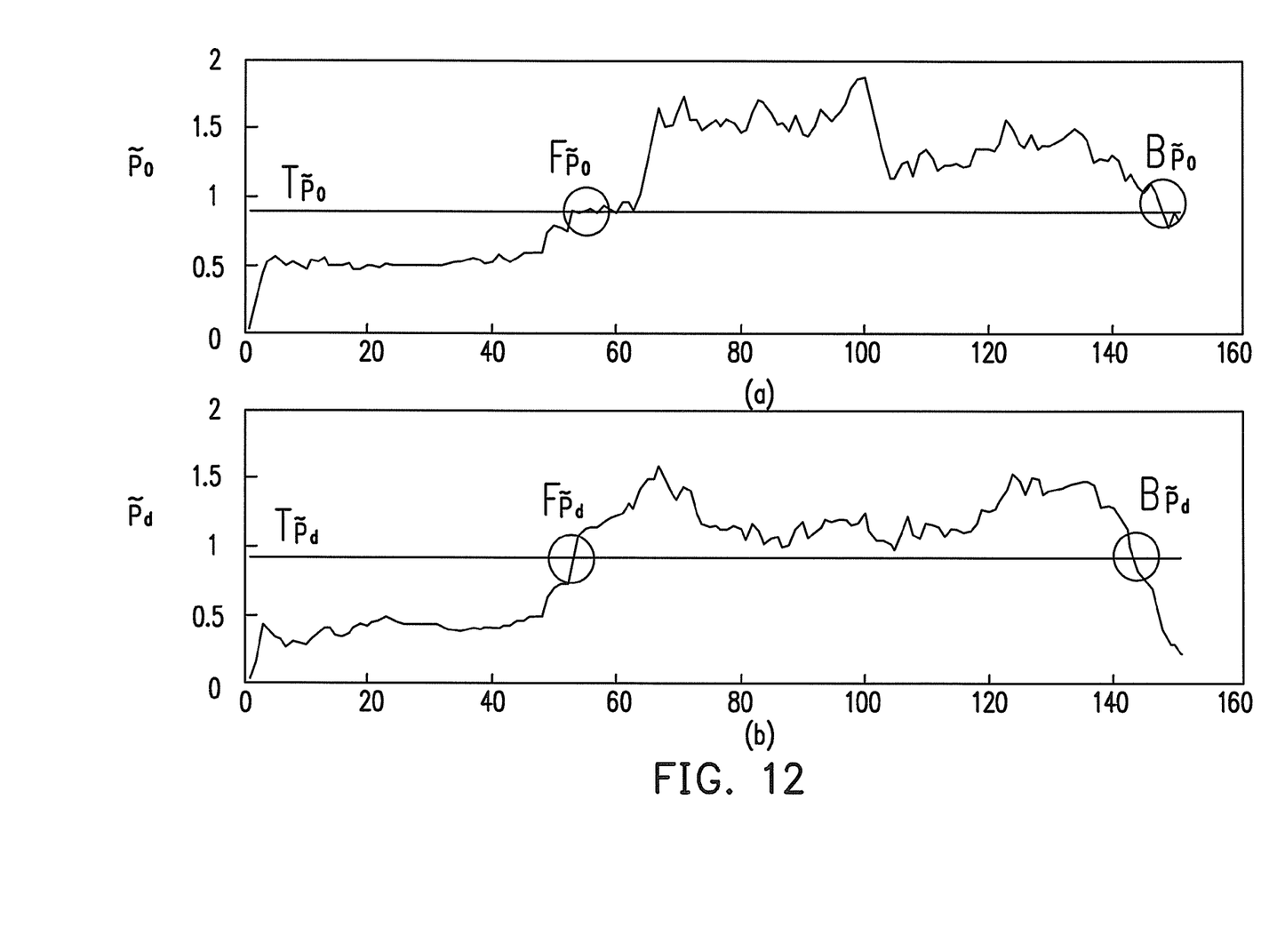

Additionally, in order to avoid the instant interferences from other electromagnetic waves in the transmission environment and accordingly misjudgment of the receiver during the process for detecting the beginning time point and the ending time point, foregoing step S630 may be implemented with sub-steps as illustrated in FIG. 11. The steps in FIG. 11 are similar to those in FIG. 9, except that after calculating the signal power $P_0[k]$ corresponding to each time index k, the receiver performs signal compensation to the signal power corresponding to each time index through a smoothing filter (step S1115) to obtain compensated signal power, wherein the compensated signal power is denoted as $\tilde{P}_0[k]$ (k=0~147). Besides, after calculating the signal power difference $P_d[k]$ corresponding to each time index k, the receiver performs signal compensation to the signal power difference corresponding to each time index through the smoothing filter (step S1145) to obtain compensated signal power difference, wherein the compensated signal power difference is denoted as $\tilde{P}_d[k]$ (k=0~147). The waveforms of the compensated signal power $\tilde{P}_0[k]$ and the compensated signal power difference $\tilde{P}_d[k]$ are respectively illustrated in FIG. 12(a) and FIG. 12(b).

In addition, the steps S1120 and S1130 in FIG. 1 are respectively similar to the steps S920 and S940 in FIG. 9, except that in the steps S1120 and S1130, the compensated signal power $\tilde{P}_0[k]$ instead of the signal power $P_0[k]$ is used. Similarly, the steps S1150 and S1160 in FIG. 11 are respectively similar to the steps S950 and S960 in FIG. 9, except that in the steps S1150 and S1160, the compensated signal power difference $\tilde{P}_d[k]$ instead of the signal power difference $P_d[k]$ is used.

Referring to FIG. 6 again, after the beginning time point and the ending time point of the interference are obtained, the receiver determines a time for turning on its interference cancellation filter according to the detected beginning time point and ending time point (step S640). In other words, the receiver determines the time when the received burst signal is affected by co-channel interference according to the detected beginning time point and ending time point and allows the part of the burst signal which is affected by the co-channel interference to be processed by the interference cancellation filter while the other parts of the burst signal which are not affected by the co-channel interference to be directly equalized or filtered. Generally, the receiver may process and equalize the parts in the burst signal which are not affected by the co-channel interference through MLSE.

As described in foregoing embodiment, the receiver equalizes or filters the burst signal through MLSE or an interference cancellation filter. As to an existing GSM system, the receiver decodes and demodulates the equalized or filtered burst signal in order to restore the original information. In the present embodiment, when the receiver is performing a decoding algorithm, the receiver can adjust branch metrics corresponding to the beginning time point and the ending time point by using the detected beginning time point and ending time point. For example, the receiver may reduce the branch metrics corresponding to the beginning time point and the ending time point of the interference. In other words, owing to the burst signal receives series co-channel interference during the period between the beginning time point and the ending time point, the error correction capability of the receiver can be improved by adjusting the branch metrics.

Figure 13:
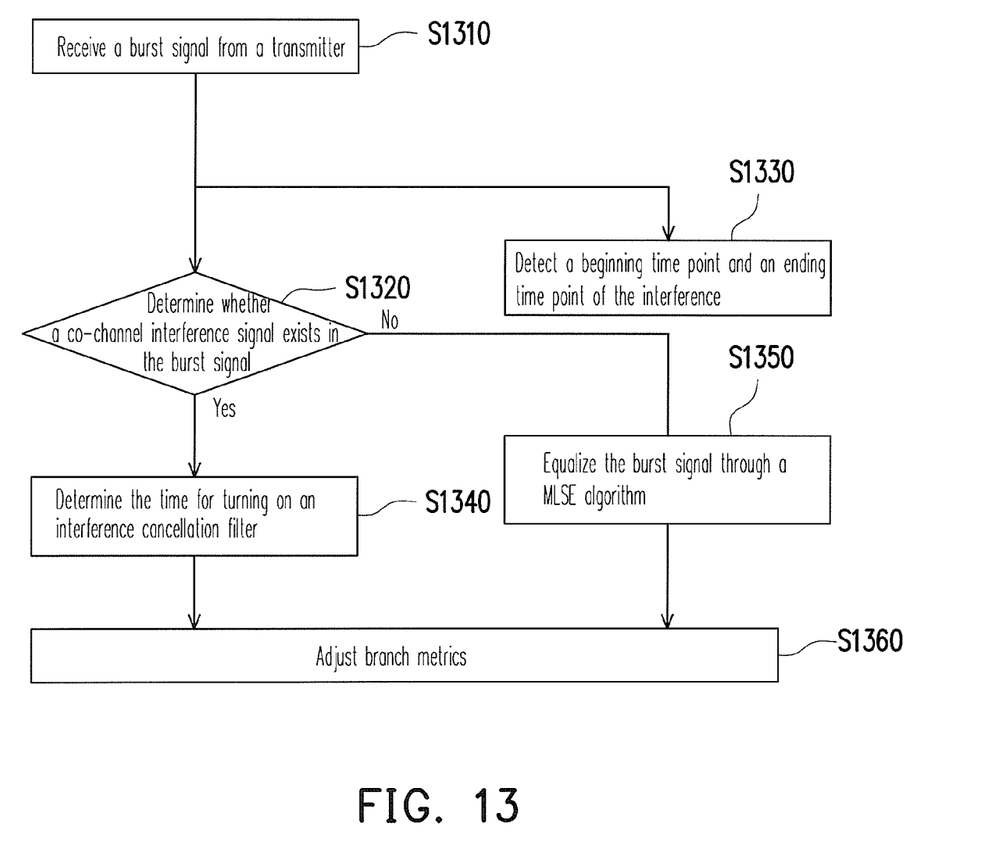
FIG. 13 is a flowchart of an interference mitigating method according to yet another embodiment of the present invention.

FIG. 13 is a flowchart of an interference mitigating method according to another embodiment of the present invention. Here, it is assumed that the present embodiment is applied to the same situation as the embodiment illustrated in FIG. 6. Referring to FIG. 13, first, the receiver receives a burst signal from a transmitter (step S1310). Then, the receiver determines whether a co-channel interference signal exists in the burst signal (step S1320) and detects a beginning time point and an ending time point of the interference (step S1330). In the present embodiment, the steps S1320 and S1330 are respectively similar to the steps S620 and S630 in the embodiment described above therefore will not be described herein.

Next, when the receiver determines that the co-channel interference signal exists in the burst signal, the receiver then determines the time for turning an interference cancellation filter thereof according to the beginning time point and the ending time point detected in step S1330 (step S1340). Contrarily, when the receiver determines that the co-channel interference signal does not exist in the burst signal, the receiver performs an MLSE to equalize the burst signal (step S1350). Finally, the receiver adjusts the branch metrics corresponding to the time between the beginning time point and the ending time point in a decoding algorithm according to the beginning time point and the ending time point of the interference detected in step S1330 (step S1360), wherein the branch metrics may be adjusted according to the SINR between the beginning time point and the ending time point. In order words, in foregoing step S1360, both the SINRs between the beginning time point and the ending time point and the SINR not between the beginning time point and the ending time point in the burst signal are calculated, and the SINRs are respectively multiplied by branch metrics in the decoding algorithm so as to adjust the branch metrics.

The SINR in a burst signal is reduced when the burst signal receives co-channel interference. Thus, in foregoing method for adjusting branch metrics with SINRs, the branch metrics corresponding to the time between the beginning time point and the ending time point are reduced while the branch metrics corresponding to the time out of the beginning time point and the ending time point are increased. As a result, the error correction capability of the receiver is improved. Aforementioned decoding algorithm may be a Viterbi decoding method or other error correction code decoding method.

Figure 14:
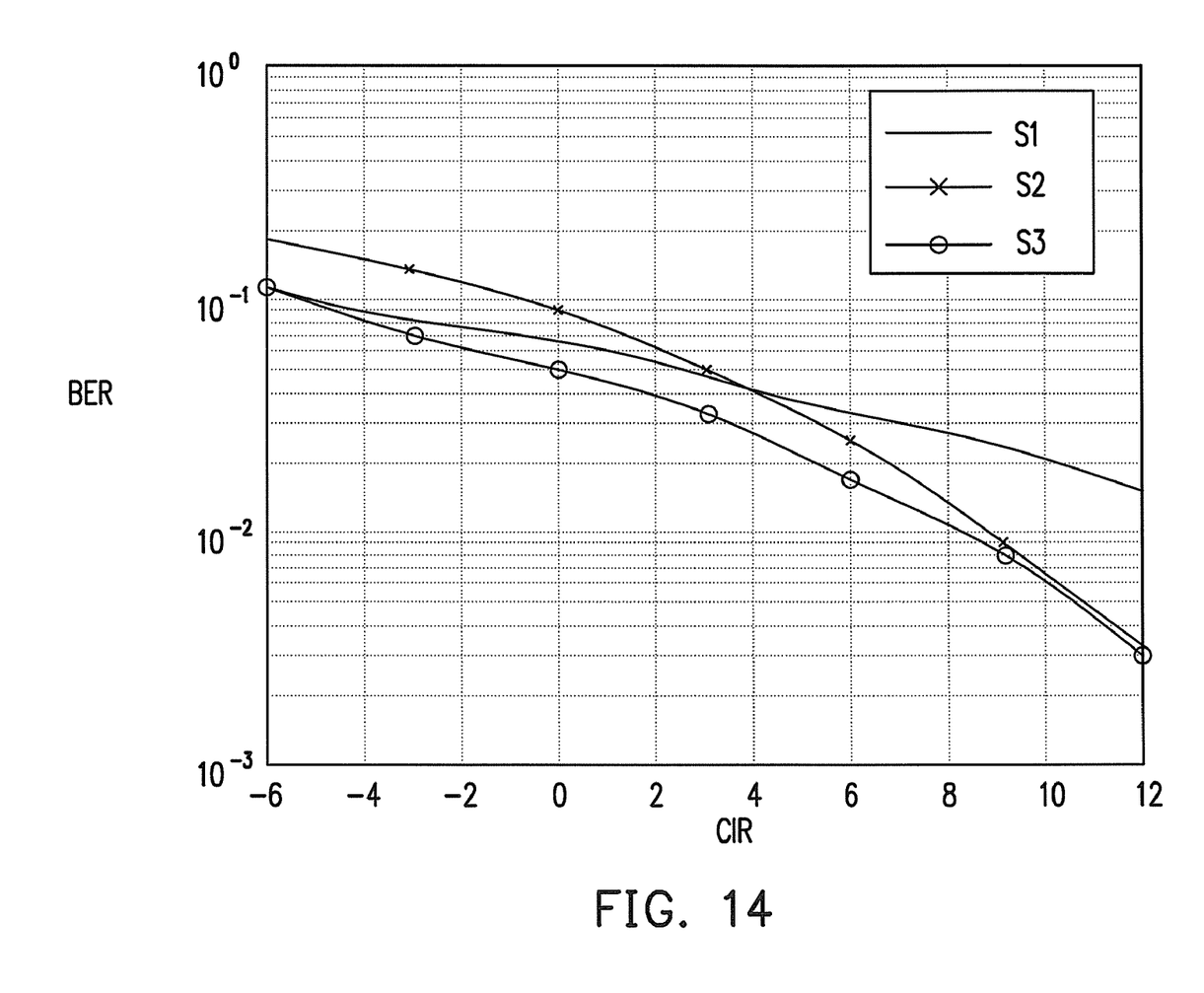
FIG. 14 illustrates trend lines of the bit-error rate (BER) of a receiver with different carrier-to-interference ratios (CIR).

Below, the performance of a receiver in a GSM system is simulated through computer simulation. FIG. 14 illustrates trend lines of bit-error rate (BER) of a receiver with different carrier-to-interference ratios (CIR). Referring to FIG. 14, the first curve S1 shows the performance of the receiver when the entire received signal is filtered by using a SAIC filter. The second curve S2 shows the performance of the receiver when no SAIC filter is adopted. The third curve S3 shows the performance of the receiver when the technique provided by the present invention is adopted. As shown in FIG. 14, the receiver using the technique in the present invention has obviously better performance than the other receivers.

In summary, the present invention has at least following advantages:

1. In the present invention, the beginning time point and the ending time point of interference are detected and the time for turning on an interference cancellation filter is determined according to the detected beginning time point and ending time point, so that the receiver only turns on the interference cancellation filter when the received signal receives co-channel interference. Accordingly, the received signal without the co-channel interference can avoid signal distortion caused by overcompensation.

2. In the present invention, branch metrics in a decoding method are adjusted according to the detected beginning time point and ending time point, so that the branch metrics corresponding to the burst signal with co-channel interference are reduced and accordingly the error correction capability of the receiver is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for mitigating interference applied in a wireless communication system, comprising the steps of:
    (a) receiving a received signal from a transmitter, wherein the received signal includes a training sequence;
    (b) calculating a signal-to-interference-plus-noise ratio (SINR) of the training sequence in the received signal, determining whether a co-channel interference signal exists in the received signal according to the SINR, and calculating signal power corresponding to a plurality of time indexes in the received signal for detecting a beginning time point and an ending time point of the co-channel interference signal; and
    (c) turning on an interference cancellation filter when the co-channel interference signal in the received signal is detected according to the beginning time point and the ending time point.

2. The method according to claim 1, wherein when there is no co-channel interference signal in the received signal, a maximum-likelihood sequence estimation is performed to equalize the received signal.

3. The method according to claim 1, wherein step (c) further comprises:
    equalizing the received signal through the interference cancellation filter when the time indexes corresponding to the received signal are between the beginning time point and the ending time point, otherwise, the received signal is performed to equalize through a maximum-likelihood sequence estimation.

4. The method according to claim 1, wherein the step of calculating the SINR of the training sequence in the received signal further comprises:
- estimating a first channel impulse response by the training sequence in the received signal;
- calculating a convolution of a predetermined training sequence and the first channel impulse response to obtain a first estimated signal, and calculating the power of the first estimated signal;
- comparing the first estimated signal with the training sequence in the received signal to obtain a first interference noise, and calculating power of the first interference noise; and
- calculating a ratio of the power of the first estimated signal to the power of the first interference noise to obtain the SINR.

5. The method according to claim 4, wherein the step of determining whether the co-channel interference signal exists in the received signal comprises:
- comparing the SINR with a first threshold, wherein the co-channel interference signal exists in the received signal when the SINR is smaller than the first threshold.

6. The method according to claim 4, wherein the step of calculating the SINR of the training sequence in the received signal further comprises:
- executing an interference cancellation algorithm to the received signal to obtain an equivalent received signal;
- estimating a second channel impulse response according to an equivalent training sequence of the equivalent received signal;
- calculating a convolution of the predetermined training sequence and the second channel impulse response to obtain a second estimated signal, and calculating power of the second estimated signal;
- comparing the second estimated signal with the training sequence in the received signal to obtain a second interference noise, and calculating the power of the second interference noise;
- calculating a ratio of the power of the second estimated signal to the power of the second interference noise to obtain an equivalent SINR; and
- calculating a ratio of the equivalent SINR to the SINR to obtain a gain coefficient.

7. The method according to claim 6, wherein the step of determining whether the co-channel interference signal exists in the received signal further comprises:
- comparing the SINR with a first threshold, and comparing the gain coefficient with a second threshold; and
- determining that the co-channel interference signal exists in the received signal when the SINR is smaller than the first threshold and the gain coefficient is greater than the second threshold.

8. The method according to claim 1, wherein the step of detecting the beginning time point and the ending time point of the co-channel interference signal comprises:
- sequentially calculating the signal power of the received signal corresponding to each said time index according to the time indexes of the received signal;
- sequentially comparing the signal power of the received signal corresponding to the $k^{th}$ time index with the signal power of the received signal corresponding to the $(k-1)^{th}$ time index according to the time indexes of the received signal;
- locating a first time and a second time among the time indexes of the received signal, wherein the first time and the second time are respectively the minimum time index and the maximum time index in the signal power of the received signal greater than or equal to a threshold power;
- locating a third time and a fourth time among the time indexes of the received signal, wherein the third time and the fourth time are respectively the minimum time index and the maximum time index in difference of the signal power of the received signal greater than or equal to a threshold variation;
- selecting the smaller one of the first time and the third time as the beginning time point; and
- selecting the greater one of the second time and the fourth time as the ending time point.

9. The method according to claim 8, wherein the step of sequentially comparing the signal power of the received signal corresponding to the $k^{th}$ time index with the signal power of the received signal corresponding to the $(k-1)^{th}$ time index according to the time indexes of the received signal further comprises:
- performing signal compensation to the difference of the signal power difference of the received signal corresponding to each time index through a smoothing filter.

10. The method according to claim 1 further comprising:
- adjusting corresponding branch metrics in a decoding algorithm between the beginning time point and the ending time point according to the beginning time point and the ending time point of the co-channel interference signal.

11. The method according to claim 1, wherein the wireless communication system is a Global System for Mobile communications (GSM), and the received signal is a burst signal.

12. The method according to claim 1, wherein the interference cancellation filter is a single antenna interference cancellation (SAIC) pre-filter.

* * * * *